Sept. 11, 1934.  J. A. SHAFER  1,973,663
CAR TRUCK
Filed March 15, 1929  2 Sheets-Sheet 1
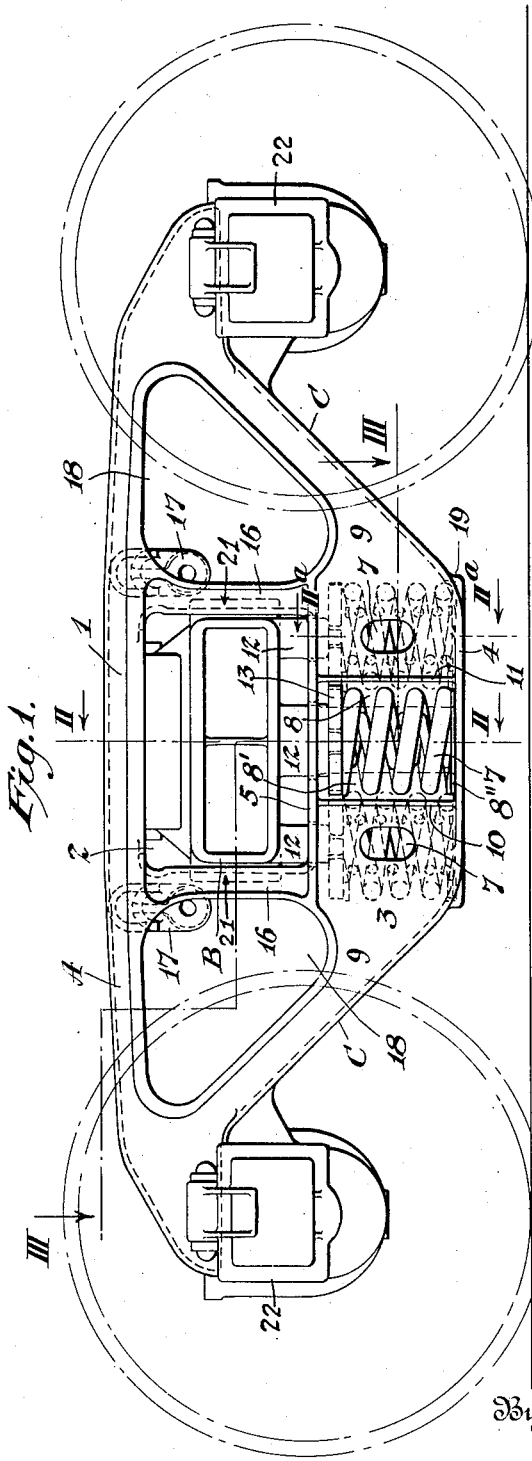
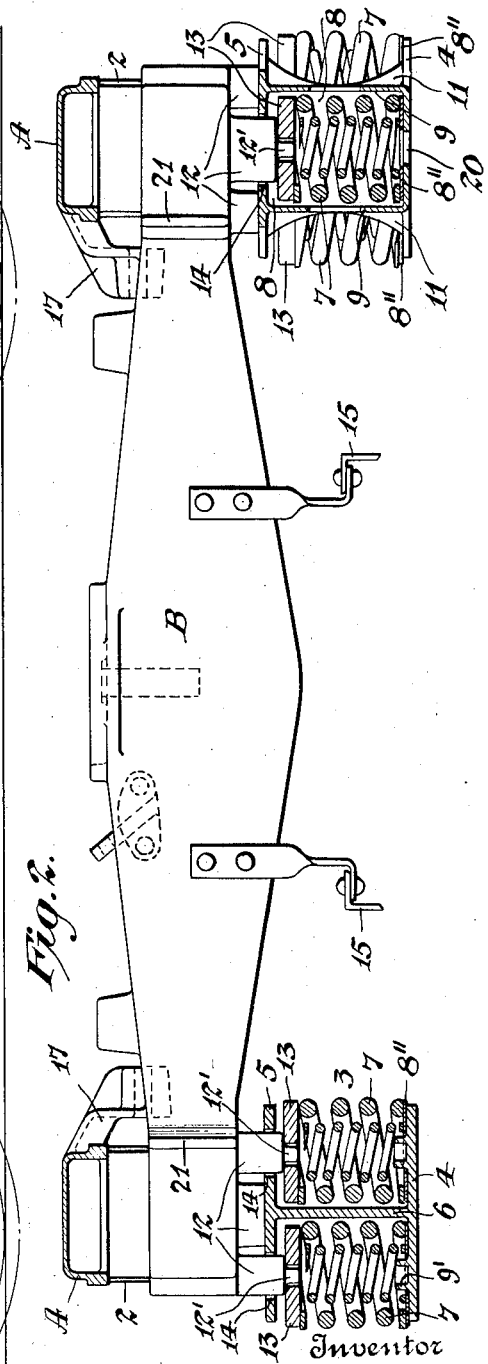
Inventor
James A. Shafer
By his Attorney
Clarence D. Kerr Sept. 11, 1934.        J. A. SHAFER        1,973,663
CAR TRUCK
Filed March 15, 1929        2 Sheets-Sheet 2
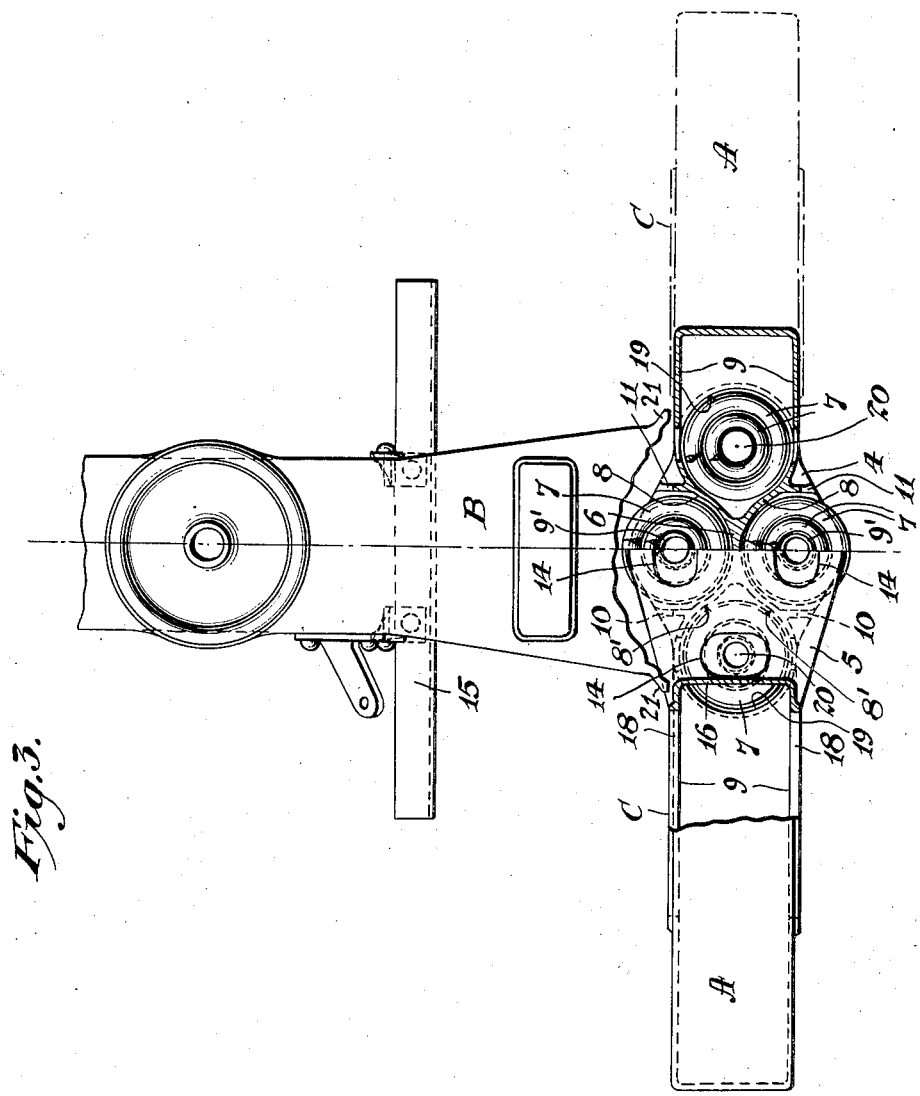
Inventor
James A. Shafer
By his Attorney
Clarence D Kerr

Patented Sept. 11, 1934

1,973,663

UNITED STATES PATENT OFFICE 1,973,663

CAR TRUCK

James A. Shafer, East Cleveland, Ohio, assignor to National Malleable and Steel Castings Company, Cleveland, Ohio, a corporation of Ohio Application March 15, 1929, Serial No. 347,262

20 Claims. (Cl. 105—197)

This invention relates to car trucks. One of its objects is the provision of an improved truck construction wherein the customary spring plank may be omitted, and the saving of a considerable amount of weight thus effected, and wherein the wheels may be easily and quickly removed and replaced without disturbing the bolster, springs or brake rigging. A further object is to provide a side frame of substantially increased strength as compared with A. R. A. (American Railway Association) standard side frames, and having stronger columns. The invention also comprises a side frame so constructed as to provide for the application of the weight thereto at a lower point than is the case in other trucks, resulting in increased stability. Also, in my improved construction the bending moment to which the side frame is subjected is considerably decreased. The invention further provides for the use of spring units of the standard A. R. A. class "G" type; four of which spring units provide greater spring capacity than seven units of the standard A. R. A. class "H" type now commonly employed, the class "G" springs further providing better riding qualities. In addition, the invention affords improved spring seating with less possibility of the springs becoming displaced, and permits ready assembly and disassembly. The invention further makes provision for guarding the springs against oversolid blows. Other features of the invention will be hereinafter described and claimed.

In the accompanying drawings:

Fig. 1 is a side elevation of a car truck embodying my invention;

Fig. 2 is a view showing the bolster in side elevation and the car truck side frames in section, the side frame appearing in Fig. 1 being shown in Fig. 2 in section along the line II—II of Fig. 1 and the opposite side frame being shown in Fig. 2 in section along the line IIa—IIa indicated in Fig. 1; and Fig. 3 is a view partly in plan and partly in horizontal section on line III—III of Fig. 1.

Referring more particularly to the drawings, my improved truck comprises two side frames A and a truck bolster B.

Each of the side frames A includes a compression member 1 and is provided with a window 2 beneath said compression member for the reception of the bolster. The latter, as shown in Fig. 2, extends laterally into the openings 2 of the side frames. Below the window each side frame is formed with a spring seating and housing portion designated generally by the numeral 3, which spring housing portion merges with the side frame tension members C and comprises a bottom shelf 4, a top flange 5, and a reinforcing web 6 extending between said shelf and flange. The web 6 comprises bifurcated or diverging portions 8—8 and 8'—8', respectively, which portions merge into the side walls 9 of the tension members C. Also, said web includes ribs 10—10 and 11—11, projecting from the aforesaid diverging portions. It will be seen that the web 6, including the diverging portions 8—8 and 8'—8' aforesaid, serves not only to reinforce the spring seat portion of the side frame but also to provide compartments for the respective spring units 7, which are mounted on spring plates 8'' on the shelf 4. The spring units 7 are preferably of the standard A. R. A. class G type. The spring seating portion 3 of the side frame in the embodiment shown provides a spring bearing area which is greater than that of standard A. R. A. side frames, said increased area serving to accommodate four class G spring units. It may be noted that four spring units of the class G type provide greater spring capacity at ⅛ inch from solid height than do seven units of the standard A. R. A. class H type, which have formerly been employed for increased spring capacity trucks, when driven solid.

The bolster is supported upon the springs 7 through the medium of lugs 12 depending from said bolster and seated upon caps 13 on the upper ends of the springs. Extensions 12' of the lugs 12 project into apertures in said caps. The lugs 12 on each end of the bolster further pass through holes 14 in the adjacent spring seat top flange 5. It will thus be seen that I provide for effectively tying the side frames together by the bolster and that I am thereby enabled to dispense with the spring plank customarily employed for this purpose. Attached to the bolster are brackets 15 for receiving the brake beams and preventing them from falling on the rails in case of broken hangers. The springs 7 are protected from oversolid blows by the top flange 5; the bolster coming into contact with said flange before the springs are driven solid. The top flange 5 merges into the truck columns 16 which extend upwardly from said flange and form the sides of the window opening 2, as shown.

Through the construction which I have provided, the strength of the side frames is materially increased. It may be noted that the depth of the spring seat 3 is much greater than that of the spring seat of the standard A. R. A. frame, and that the truck columns 16 are in my structure considerably stronger since they are shorter and are not offset to clear bolster stop lugs as is the case in A. R. A. standard side frames.

The stability of the truck frames is moreover increased by my construction since the weight is applied thereto considerably lower than on other trucks. In addition, it should be noted that I have so arranged for the distribution of the weight among the springs 7 that the bending moment to which the frame is subjected is comparatively low due to the fact that of the load applied to the group of four spring units on the frame only half is applied at the center of the frame while, as will be particularly clear from Figures 1 and 3, the remainder of the load is applied almost under the columns 16. It will also be apparent that with my spring housing construction there is very little likelihood of the springs becoming shifted out of place.

It has been noted that the spring seating construction which I have disclosed provides for the use on the side frame of four spring units of the standard A. R. A. class G type. Through the employment of these springs better riding qualities in addition to greater spring capacity are obtained as compared with the class H spring units customarily utilized. This arises from the fact that the class G springs have greater deflection for a given load (and without sacrificing ultimate capacity) than is the case with the class H units. In addition, the inner coil of a class G spring unit is some ⅜" shorter than the outer coil, whereas the inner and outer coils of class H springs are of substantially the same length, with the result that class G springs further afford superior riding qualities for cars that are empty or only lightly loaded.

To disassemble the truck it is only necessary to remove the brake hanger pins from the brackets 17 and raise the bolster a slight distance, whereupon the side frames can be removed or replaced without disturbing the springs 7 or the brake rigging attached to the bolster.

The spring units 7 may be readily removed from or inserted into the side frame spring seating portion 3. Thus, those spring units that underlie the columns 16 may be removed from or inserted into the side frame portion 3 through the openings 18 at the tops of the channel-shaped tension members C, it being noted that the compartments for those springs communicate with the interior or channel portions of said tension members. The remaining spring units may be applied or removed through the open sides of the housing 3 between the respective ribs 10, 11.

It may be noted that the shelf 4 is formed at its end portions with semi-circular flanges 19 merging with the tension members C, said flanges forming retaining walls for the associated spring plates 8" and maintaining the corresponding spring units properly centered in their compartments. Below the spring plates cooperating with the flanges 19 are openings 20 in the shelf 4 aligned with openings in said spring plates, as shown, for drainage purposes. The two remaining or intermediate spring units 7 are shown centered by dowels or bosses 9' extending upwardly from the shelf 4 and passing through openings in the adjacent spring plates.

The lugs 12 through which the bolster is tied or anchored to the side frames are shown elongated for strengthening purposes and the respective openings 14 are correspondingly elongated.

Projections 21 extending laterally of the bolster adjacent the inner sides of the side frame columns 16 are adapted to engage said columns upon outward movement of the bolster with respect thereto, so that thrusts of the bolster outwardly of either side frame are taken by the columns thereof. Also, it may be noted that the frame shelf 14, through which the bolster lugs 12 extend, is substantially in a horizontal plane passing through the centers of the journal boxes 22. Thrusts of the bolster laterally of the side frame may also be transmitted through these lugs. It will thus be seen that since lateral thrusts imparted to the side frame from the bolster will be transmitted through lugs 12 and projections 21, the tendency of the side frame to swing laterally or tip is less than would be the case if only the projections 21 were provided. Moreover, thrusts of the bolster longitudinally of the side frame due to the momentum of the cars were formerly transmitted to the side frame through the columns only. In the present invention it will be seen that when the brakes are applied the force due to the momentum of the car will be transmitted through lugs 12 substantially on a line with the centers of the journals as well as through the columns 16, thus relieving the columns of some of the stress which formerly they were forced to carry.

The terms and expressions which I have employed are used as terms of description and not of limitation, and I have no intention, in the use of such terms and expressions, of excluding any mechanical equivalents of the features shown and described or portions thereof, but recognize that various structural modifications are possible within the scope of the invention claimed.

What I claim is:

1. In a car truck, the combination of a pair of side frames, each of said side frames having a spring seating portion and also having a bolster receiving opening thereabove, a bolster extending laterally into the openings in said side frames, springs carried by said seating portion, projections extending from said bolster through portions of the side frame, said projections receiving the thrust of said springs and enabling the bolster to tie the side frames together.

2. In a car truck, the combination of a bolster, a side frame having a compression member, a spring seating portion in said side frame, a top flange on said seating portion below said compression member, and engaging means between said bolster and said flange for connecting the side frame and the bolster.

3. In a car truck the combination of a bolster, a side frame comprising a compression member and having a bolster receiving opening below said member, said bolster extending laterally into said opening, downwardly extending projections on the bolster engaging said side frame for tying the latter to the bolster and springs on said side frame for supporting the bolster through said projections.

4. In a car truck the combination of a bolster, side frames, each of said side frames having a compression member and a spring housing portion below said compression member and spaced therefrom by columns to provide a bolster receiving opening, said bolster extending into said opening and means carried by said bolster and projecting through an opening in said housing whereby the bolster serves as a connecting means between said side frames.

5. In a car truck, the combination of a bolster, a side frame having a compression member, a spring seating portion on said side frame and having a top flange below said compression member, a bolster extending into the space between said member and said flange, means on said bolster projecting through said top flange, and springs on said seating portion supporting said bolster through the medium of said projecting means.

6. In a car truck, a side frame having a compression member and a bolster-receiving window therebelow with columns at the sides of said window, a spring housing portion extending beneath said columns and being opened outwardly at each end thereof at points beneath said columns, said housing portion comprising a bottom shelf and a top flange, and a spring insertible through an open end of said housing portion, said top flange being positioned at the base of said columns and rigid therewith.

7. In a car truck, a side frame having a bolster-receiving window and columns at the sides of said window, a spring housing portion positioned below said columns, said housing comprising a bottom shelf and a top flange connecting said columns, and a central reinforcing web between said shelf and said flange.

8. In a car truck, a side frame having a bolster-receiving window and columns at the sides of said window, an open ended spring housing portion located below said window and having side walls extending upwardly from points directly beneath the columns to the bases thereof, and springs in said housing portion for supporting a bolster, certain of said springs being positioned adjacent said open ends for receiving their portion of the load, adjacent the respective columns.

9. In a car truck, a side frame having a bolster-receiving window and columns at the sides of said window, a spring housing portion located below said window and having side walls extending upwardly from points directly beneath the columns to the bases thereof, said spring housing portion also having spring receiving openings at each end between said side walls, and bolster-supporting springs in said housing portion, certain of said springs being adjacent said openings and extending under said columns.

10. In a car truck, a side frame having a spring seating portion and a compression member thereabove, and means comprising a top wall of said seating portion for projecting the springs from over-solid blows, said top wall overlying said springs and being positioned below said compression member.

11. In a car truck, a side frame having a compression member and a spring seating portion including a top flange below said compression member, springs in said portion, a bolster, projections between said springs and said bolster through which the bolster is supported on said springs, said projections passing through apertures in said flange, said flange being so arranged with respect to said bolster as to protect the springs from oversolid blows.

12. In a car truck, a side frame having a seating portion comprising a bottom shelf and a top flange, and reinforcing means between said shelf and flange and dividing said seating portion into compartments, one for each of a plurality of springs.

13. A side frame comprising tension and compression members and columns, portions of said tension member being of box section, said box section opening in the direction of the outwardly adjacent parts of the tension member for the insertion and removal of springs.

14. A side frame comprising tension and compression members and columns, a window opening for inserting a bolster, a spring receiving pocket below said opening, said pocket opening outwardly toward the adjacent end of the frame for reception and removal of springs.

15. In a car truck, a bolster, a side frame having a central window opening and a hollow tension portion beneath said opening, the side frame having openings on each side of said tension portion, and bolster supporting springs insertible through said openings.

16. In a side frame, tension and compression members and columns joining said tension and compression members, a spring seating on the bottom wall of said tension member and supporting the bolster, said columns terminating above the bottom wall of said tension member a distance greater than the height of said spring, and means on said bolster extending below said columns for engaging said spring.

17. In a car truck, a side frame comprising compression and tension portions having a journal box at each end thereof, a bolster having projections extending through a portion of said side frame below said compression portion and substantially in line with the centers of the journal boxes whereby thrusts are transmitted from the bolster to the side frame in line with the centers of the journals.

18. In a car truck, a bolster and a side frame having a bolster receiving window, and columns at the sides of said window adapted to receive thrusts from said bolster, said side frame having a shelf portion, and said bolster having means integral therewith projecting into said shelf portion for transmitting thrusts thereto.

19. In a car truck, a side frame, journal boxes at the ends thereof for receiving the journals of wheels of said truck, said side frame having a shelf portion intermediate said journal boxes and substantially in alignment with the centers of said journals, and a bolster having a projection passing through an opening in said shelf portion.

20. In a car truck, a bolster, a pair of side frames, each having a shelf and a tension portion below said shelf, spring means arranged longitudinally of the side frame and positioned within the side walls of said tension portion, and means on said bolster projecting from opposite ends thereof through the shelves of the respective side frames and integral with said bolster for tying said side frames together, said spring means cooperating with the associated bolster projecting means for supporting said bolster.

JAMES A. SHAFER.